United States Patent
Deolalikar et al.

(10) Patent No.: US 8,180,744 B2
(45) Date of Patent: May 15, 2012

(54) MANAGING STORAGE OF DATA IN A DATA STRUCTURE

(75) Inventors: Vinay Deolalikar, Cupertino, CA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 555 days.

(21) Appl. No.: 12/243,103

(22) Filed: Oct. 1, 2008

(65) Prior Publication Data

US 2010/0082562 A1     Apr. 1, 2010

Related U.S. Application Data

(60) Provisional application No. 61/033,811, filed on Mar. 5, 2008.

(51) Int. Cl.
G06F 7/00        (2006.01)
G06F 17/00       (2006.01)

(52) U.S. Cl. .................. 707/695; 707/825; 711/216

(58) Field of Classification Search .................. None
See application file for complete search history.

(56) References Cited

U.S. PATENT DOCUMENTS

| | | | | |
|---|---|---|---|---|
| 5,339,398 A * | 8/1994 | Shah et al. | | 711/216 |
| 5,963,909 A * | 10/1999 | Warren et al. | | 705/52 |
| 6,154,747 A * | 11/2000 | Hunt | | 1/1 |
| 6,199,178 B1 * | 3/2001 | Schneider et al. | | 714/21 |
| 6,275,919 B1 * | 8/2001 | Johnson | | 711/216 |
| 6,330,557 B1 * | 12/2001 | Chauhan | | 1/1 |
| 6,366,987 B1 * | 4/2002 | Tzelnic et al. | | 711/162 |
| 6,442,553 B1 * | 8/2002 | Take | | 707/747 |
| 6,529,995 B1 * | 3/2003 | Shepherd | | 711/114 |
| 7,080,072 B1 * | 7/2006 | Sinclair | | 1/1 |
| 7,761,458 B1 | 7/2010 | Eshghi | | |
| 7,797,323 B1 | 9/2010 | Eshghi | | |
| 7,814,078 B1 | 10/2010 | Forman | | |
| 7,856,437 B2 | 12/2010 | Kirshenbaum | | |
| 7,895,666 B1 | 2/2011 | Eshghi | | |
| 2003/0026020 A1 * | 2/2003 | Buckingham | | 360/48 |
| 2003/0066010 A1 * | 4/2003 | Acton | | 714/758 |
| 2003/0074341 A1 * | 4/2003 | Blackburn et al. | | 707/1 |
| 2006/0023596 A1 * | 2/2006 | Ogawa et al. | | 369/53.2 |
| 2006/0106857 A1 | 5/2006 | Lillibridge | | |
| 2006/0116989 A1 * | 6/2006 | Bellamkonda et al. | | 707/3 |
| 2006/0152636 A1 * | 7/2006 | Matsukawa et al. | | 348/715 |
| 2006/0235903 A1 * | 10/2006 | Kapur | | 707/202 |
| 2007/0005627 A1 * | 1/2007 | Dodge | | 707/101 |
| 2007/0286194 A1 * | 12/2007 | Shavitt et al. | | 370/392 |
| 2008/0016576 A1 * | 1/2008 | Ueda et al. | | 726/26 |

OTHER PUBLICATIONS

Eshghi et al., HP, A Framework for Analyzing and Improving Content-Based Chunking Algorithms, 2005 (11 pages).
Wikipedia, Hash Function, Jul. 2006 (4 pages).
Little et al., The Computer Journal, vol. 45, No. 6, 2002, Using Bloom Filters to Speed-up Name Lookup in Distributed Systems (8 pages).
A.Z. Broder et al., "Min-Wise Independent Permutations," pp. 1-36 (1998).

* cited by examiner

*Primary Examiner* — Pierre Vital
*Assistant Examiner* — Augustine Obisesan

(57) ABSTRACT

A particular data value is represented as a group of segments stored in corresponding entries of a data structure. Additional data values represented by corresponding groups of segments are written into the data structure. A probability of overwriting segments representing the particular data value increases as a number of the additional data values increase. A correct version of the particular data value is retrieved even though one or more segments representing the particular data value has been overwritten.

23 Claims, 4 Drawing Sheets

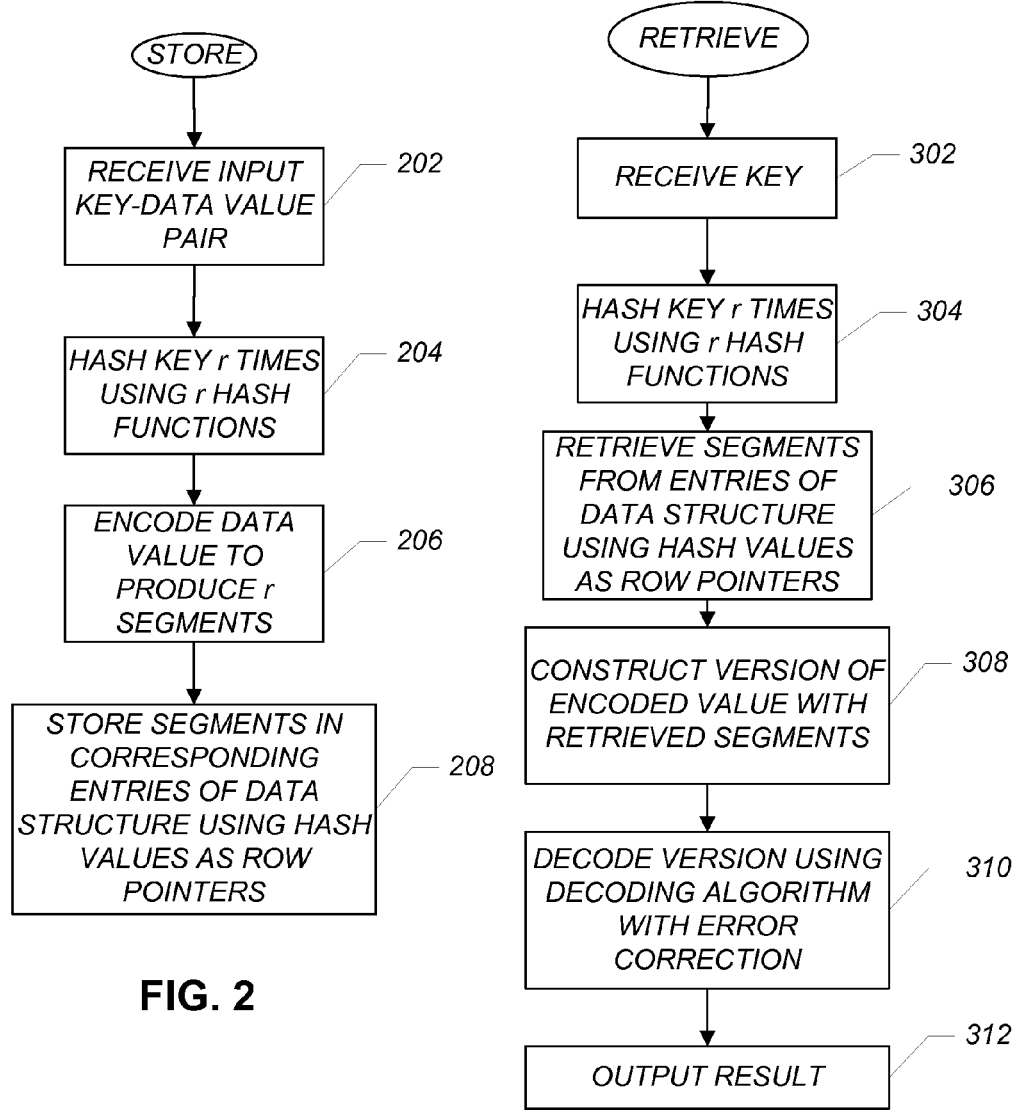

MANAGING STORAGE OF DATA IN A DATA STRUCTURE

CROSS REFERENCE TO RELATED APPLICATION

This application claims the benefit under 35 U.S.C. §119(e) of U.S. Provisional Application Ser. No. 61/033,811, entitled "MANAGING STORAGE OF DATA IN A DATA STRUCTURE," filed Mar. 5, 2008.

BACKGROUND

In computers, storage devices (such as memory devices) are used to store various data involved in the execution of software or to perform other tasks, such as communications tasks, management tasks, and so forth. Data structures, such as tables, stored in storage devices often have fixed sizes. Examples of fixed-size data structures include lookup tables used in cache memory subsystems, lookup tables used for database applications, and so forth.

With a fixed-size data structure, an algorithm conventionally has to be provided to explicitly select a data item in the data structure to remove (to eject the data item) so that space is freed up to enable addition of a new data item to the data structure. An example of such an algorithm is a least recently used (LRU) replacement algorithm. However, having to provide an algorithm to explicitly eject (remove) a data item from a data structure adds complexity to a system.

BRIEF DESCRIPTION OF THE DRAWINGS

Some embodiments of the invention are described, by way of example, with respect to the following figures:

FIG. 2 illustrates a procedure to store data into a data structure, according to an embodiment;

FIG. 3 is a flow diagram of a procedure to retrieve data from the data structure, according to an embodiment;

DETAILED DESCRIPTION

In accordance with some embodiments, a technique is provided to enable storage of data items into a fixed-size data structure without having to provide an explicit eject mechanism for selecting data items in the data structure to remove such that new data can be inserted into the data structure. A technique according to some embodiments, gradually degrades data items stored in the data structure by probabilistically overwriting different portions of existing data items in the data structure as new data items are inserted into the data structure. As more data items are inserted into the data structure, the degradation of earlier data items (data items written into the data structure at an earlier time) is increased until, at some point, the earlier data items are considered lost and cannot be retrieved. A data item that has been degraded to a point that it is no longer retrievable is considered to have "exit" the data structure, even though no explicit eject mechanism has been provided to remove this data item.

A "data item" (or interchangeably, "data value") refers generally to a unit of data that can be stored into a data structure. In accordance with some embodiments, the data item or data value is first encoded, and it is the encoded version of the data item or data value that is stored in the data structure. Thus, storing a data item or data value in a data structure can refer to storing an encoded version of the data item or data value in the data structure. A "data structure" refers to some predefined arrangement that provides entries for accepting data.

More specifically, it is desired to store p key-data value pairs $(K_i, V_i)$, i=1 to n (where $[[n \cdot 1]] n \geq 1$), in r arrays (named $A_1, \ldots, A_r$) each of size q×1, where $[[p \cdot 1]] p \geq 1$, $[[r \cdot 1]] r \geq 2$, and $[[q \cdot 2]] q \geq 2$.

Figure 1:
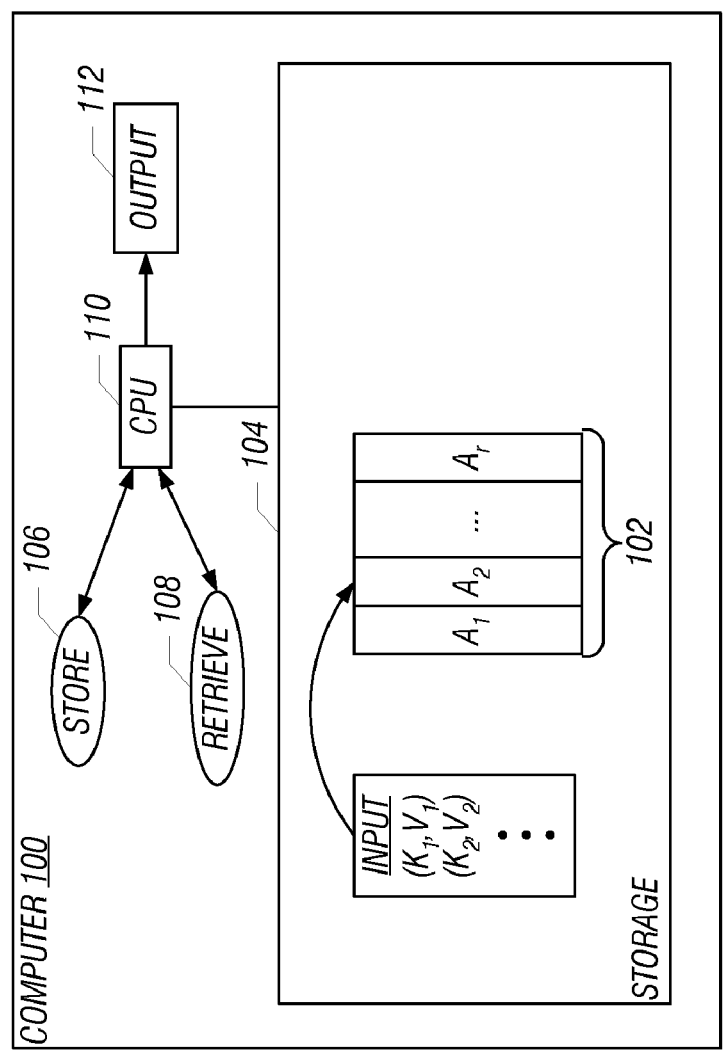
FIG. 1 is a block diagram of an example computer in which an embodiment of the invention is incorporated.

Each key $K_i$ is formed of s bits, and each data value $V_i$ is formed of t bits, where $[[s \cdot 1]] s \geq 1$, $[[\cdot 1]] t \geq 1$. The r arrays, each of size q×1, are depicted as $A_1, A_2, \ldots A_r$ in FIG. 1. The arrays $A_1, A_2, \ldots A_r$ together form a data structure 102, as depicted in FIG. 1. In the example data structure 102 of FIG. 1, each array $A_j$, j=1 to r, makes up a corresponding column of the data structure 102. Thus, in FIG. 1, the data structure 102 has r columns, each corresponding to respective array $A_j$. The data structure 102 has q rows, which corresponds to the length of each array $A_j$. In a different implementation, the arrays $A_j$, j=1 to r, can be arranged as rows in the data structure 102, with the columns defined by the q entries in each array $A_j$.

As depicted in FIG. 1, the data structure 102 is stored in a storage 104 of a computer 100, where the storage 104 can be implemented with storage devices such as dynamic random access memories (DRAMs), synchronous DRAMs, disk media, and so forth. The computer 100 can be a personal computer, server computer, a communications device, a storage controller, and so forth.

As further depicted in FIG. 1, key-data value pairs $(K_i, V_i)$ are input or inserted into the data structure 102. Note that in some embodiments, the data values $V_i$ (and more specifically, representations of the data values $V_i$) are stored in the data structure 102, and the keys $K_i$ point to where the data values $V_i$ are to be stored (in other words, the keys $K_i$ are actually not stored in the data structure 102). The representations of $V_i$ stored in the data structure 102 can be encoded versions of $V_i$, as explained further below. In other implementations, other forms of representations of $V_i$ can be stored in the data structure 102.

In accordance with some embodiments, a "time arrow" feature is associated with the data structure 102. The time arrow feature of the data structure 102 causes key-data value pairs inserted later to be more likely to be retrievable than those inserted earlier. Key-data value pairs inserted into the data structure 102 are degraded with time (or more precisely, with the number of insertions that occur after a certain key-data value pair has been inserted). Degradation of a particular key-data value pair is caused by portion(s) representing the particular data value being overwritten by subsequent insertions of key-data value pairs. The time arrow feature offers a deterministic and probabilistic behavior on the retrievability of a particular key-data value pair as a function of the number of pairs that are inserted after the key-data value pair.

To enable the retrieval of a correct version of data values from the data structure 102 even though portions representing the data values may have been overwritten, error correction codes can also be provided when storing data values into the data structure 102. A data value that has been more recently inserted into the data structure 102 is more likely to be retrievable, since such more recently inserted data value would be less likely to have portions of the data value overwritten. Stated differently, data values inserted earlier are more likely to have collisions on them (where a collision can result in one or more portions being overwritten), resulting in higher likelihood of irretrievability. The more insertions that follow a particular data value, the more are the chances that the portions used to represent the data value are overwritten, and the higher the chance of it becoming irretrievable. On the other hand, items inserted recently are less likely to have any collisions, resulting in more certain retrievability. By using a multidimensional array representation of the data structure 102, the representations of the key-data value pairs are made more robust, and the lifetime before an inserted key-data value pair is degraded is quite high.

An error correction code can be used to recover the original data value (produce a correct version of the original data value), assuming that some portion(s) of the data value has been overwritten. Adding error correction codes when storing data values into the data structure 102 enhances retrievability (or stated another way, enhances the lifetime for which data values remain retrievable). Furthermore, the error correction codes provide a threshold below which overwritten portions do not render a key-data value pair irretrievable. However, data values that have been inserted earlier are less likely to be retrievable, since more portions of such data values are likely to have been overwritten. More data portions being overwritten reduces the likelihood that an error correction code can be used to recover the data value.

In some embodiments, the data structure 102 is a hash table. A hash table refers to a table having entries pointed to (or addressed) by hash values, which are produced by hashing a key (by applying a hash function on the key). In one example, the hash table is a hash table version of a Bloom filter.

In some examples, the data structure 102 can be used as a lookup table, such as a lookup table used in a cache memory system or an index table used in a database management system. Lookup tables or index tables are accessed to allow quicker access of a larger data structure, such as a cache or database table.

As further depicted in FIG. 1, a Store software module 106 and a Retrieve software module 108 are provided in the computer 100 to enable storing and retrieval of data in the data structure 102 using techniques according to some embodiments. The software modules 106 and 108 are executable on one or more central processing units (CPUs) 110, which is (are) connected to the storage 104.

The Store software module 106 stores data (e.g., key-data value pairs) into the data structure 102. The Retrieve software module 108 is able to retrieve-data from the data structure 102 for output (112), where the output (112) can be presented in a display device, communicated over a network to a remote computer, or input to another software (not shown).

A process performed by the Store software module 106 is depicted in FIG. 2.

An input key-data value pair $(K_i, V_i)$ is received (at 202) to be inserted into the data structure 102. To insert the input key-data value pair into the data structure 102, r independent hash functions $\{h_j\}_{j=1,\ldots,r}$ are defined, each of which converts key $K_i$ to $h_j(K_i)$. In other words, the r hash functions are each applied (at 204) independently r times to produce r hash values $h_j(K_i)$, j=1 to r. These hash values are q-valued, namely they take values from $\{1, \ldots, q\}$. The hash values between 1 and q are used to point to the q rows of the data structure 102; in other words, a hash value of 1 points to row 1, a hash value of q points to row q, and so forth. In a different embodiment, instead of using hash functions applied on the key to produce hash values, different functions can be used instead, where such functions are applied to the key to produce pointer values that point to entries of the data structure 102.

Each data value $V_i$ is encoded (at 206) to produce r segments. In one embodiment, the encoding uses a (r, t, d) error correction code C such that encoding of $V_i$ produces encoded value $C_i=[c_{i1}, \ldots, c_{ir}]$. Note that the error control code is represented by calligraphed C, while the encoded version of the data value is represented by $C_i$. The (r, t, d) error correcting code refers to the type of code used to perform the encoding; for example, a (6, 4, d) code refers to an error correction code that converts a 4-byte input into a 6-byte output, where the two extra bastes are code values for performing error correction (note that d is based on the r and t values and represents how much error the error correction code can tolerate before error correction can no longer be performed). The encoded value $C_i$ has r segments $C_i=[c_{i1}, c_{i2}, \ldots, c_{ir}]$, where each segment $c_{ij}$ (j=1 to r) is stored in a corresponding column of the data structure 102. The r segments $c_{i1}$ to $c_{ir}$ together represent the data value $V_i$.

The r segments are stored (at 208) in corresponding columns of the data structure 102; in other words, segment $c_{i1}$ is stored in column 1 (or array $A_1$ in FIG. 1), $c_{i2}$ is stored in column 2 (or array $A_2$), and so forth. Note that the segments $c_{i1}$ to $c_{ir}$ are not all necessarily stored in the same row; in fact, each segment $c_{i1}$ is stored in a row of the data structure 102 according to a hash value produced by a corresponding hash function $h_j(K_i)$. In other words, segment $c_{i1}$ is stored in row $h_1(K_i)$, segment $c_{i2}$ is stored in row $h_2(K_i)$, and so forth.

Figure 4:
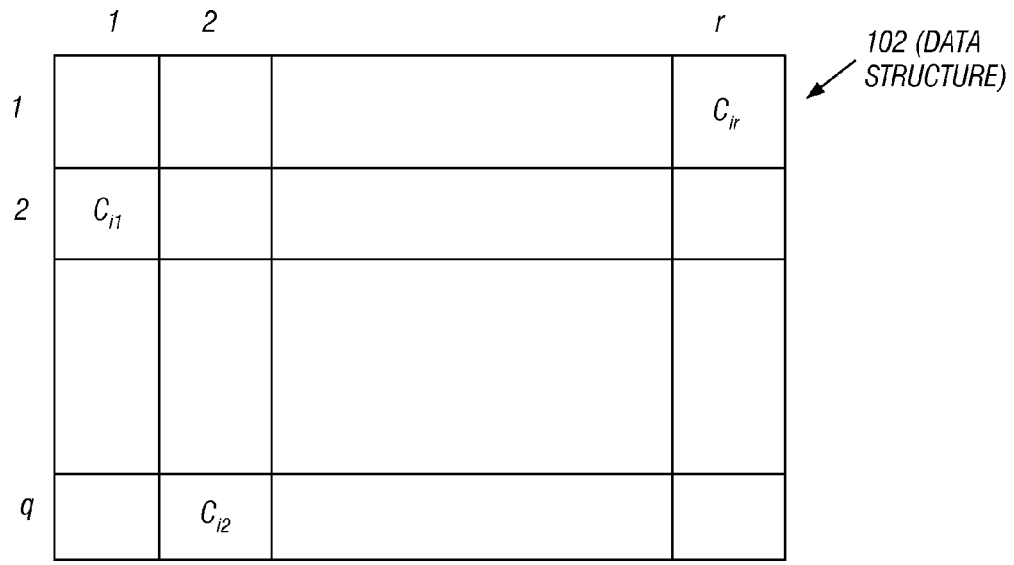
FIG. 4 illustrates an example data structure useable with some embodiments.

For example, in FIG. 4, the data structure 102 is depicted as an array of q rows and r columns. Segment $c_{i1}$ is stored in row 2 in column 1 (assuming that $h_1(K_i)$ produces a hash value of 2); segment $c_{i2}$ is stored in row q in column 2 (assuming that $h_2(K_i)$ produces a hash value of q); and $c_{ir}$ is stored in row 1 of column r (assuming that $h_r(K_i)$ produces a hash value of 1).

The process of FIG. 2 is repeated for the next key-data value pair $(K_{i+1}, V_{i+1})$ to be inserted into the data structure and so forth. As more subsequent key-data value pairs are inserted after $(K_i, V_i)$, the likelihood of segments of such subsequent key-data value pairs colliding (and therefore overwriting) segments of $(K_i, V_i)$ is increased.

FIG. 3 depicts a process performed by the Retrieve software module 108 of FIG. 1. The Retrieve software module receives (at 302) a key $K_i$ to retrieve a corresponding data value $(V_i)$ from the data structure 102. Note, that due to possible overwriting, data value $V_i$ may or may not be retrievable from the data structure 102.

Next, the key $K_i$ is hashed (at 304) r times using the same r hash functions used by the Store software module 106. Segments corresponding to the r hash values are retrieved (at 306) from the corresponding entries of the data structure 102. For example, segment $c_{i1}$ is retrieved from row $h_1(K_i)$ in column 1 (array $A_1$), segment $c_{i2}$ is retrieved from row $h_2(K_i)$ in column 2 (array $A_2$), and so forth. From the retrieved segments, the possibly corrupted version (code) $C\bullet_i$ of the encoded value $C_i=[c_{i1}, \ldots, c_{ir}]$ is constructed (at 308). This possibly corrupted version (code) $C\bullet_i$ is represented as $C\bullet_i=[c\bullet_{i1}, \ldots, c\bullet_{ir}]$. The version $C\bullet_i=[c\bullet_{i1}, \ldots, c\bullet_{ir}]$ is decoded (at 310) using standard decoding algorithms for the error correction code C. If the code C is chosen to be cyclic, then additional structure can be used to allow the decoding to be performed more efficiently.

If the original data value $V_i$ is recoverable based on the decoding, then the result that is output (at 312) is data value $V_i$, which was decoded successfully from $C\bullet_i$. However, if corruption of $C_i$ prevents recovery of $V_i$ using the error correction code, then the result output (at 312) is an error indication to indicate that the data value $V_i$ is irretrievable (indicating that $V_i$ is no longer in the data structure 102).

In the foregoing, it was assumed that all key-data value pairs stored in the data structure 102 have equal importance, and therefore the algorithm discussed above causes each key-data value pair to have equal expected life in the data structure 102. In some embodiments, it may be desirable to assign higher importance to some key-data value pairs, with such key-data value pairs of higher importance assigned a greater expected life.

The expected life of a key-data value pair (K, V) is the value of n (n insertions after (K,V) has been inserted) for which the probability of correct retrieval of (K, V) falls to below 0.5. It may be desirable that the expected life be longer for more important key-value pairs.

To counteract the degradation of a data value stored in the data structure 102 due to subsequent data value insertions the concept of diversity can be employed in some embodiments. Applying diversity causes multiple copies (rather than just one copy) of a data value to be stored in the data structure 102. Diversity is denoted by l, where l>1 indicates the number of copies of the higher importance key-data value pairs to be stored in the data structure 102.

Multiple families $H_i$, i=1 . . . l of independent hash functions (one family per data value copy) are provided for each higher importance key-data value pair. With this embodiment, the corresponding key K is hashed with multiple families of hash functions (instead of with just one set of hash functions as described above). In other words, the key K is hashed r times with a first family of hash functions; the key K is hashed r times with a second family of hash functions, and so forth. The number of families used depends on how valuable the key-data value pair is. Thus, l can be set differently for different key-data value pairs.

For each such family, a corresponding group of r segments representing the respective data value V is stored into the data structure 102 in the manner described above. The storing algorithm that takes into account multiple families of hash functions is a straightforward extension of the storing algorithm discussed in connection with FIG. 2.

Figure 5:
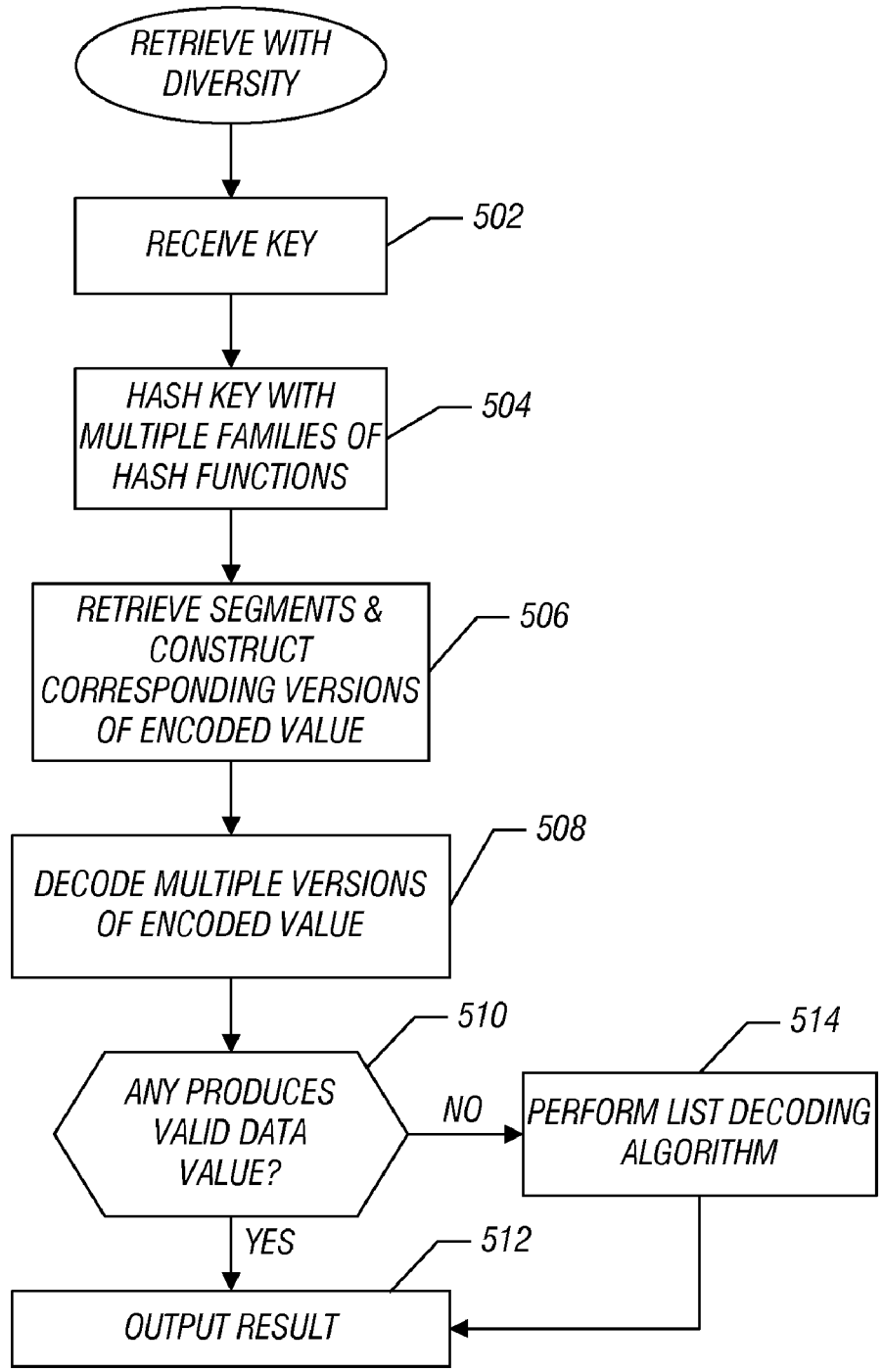
FIG. 5 is a flow diagram of another procedure to retrieve data from the data structure, according to another embodiment.

The following describes the algorithm used for retrieving a key-data value pair that is associated with multiple families of hash functions. It is desired to retrieve a pair $(K_i, V_i)$ after several insertions have occurred after $(K_i, V_i)$ was inserted into the data structure 102. Also, diversity l was used for storing $(K_i, V_i)$. As depicted in FIG. 5, after receiving (at 502) $K_i$ for retrieving $(K_i, V_i)$, $K_i$ is hashed (at 504) with the multiple (l) families of hash functions. Thus, $K_i$ is hashed r times with a first family of hash functions; $K_i$ is hashed r times with a second family of hash functions; and so forth (depending on the value of l).

For each family of hash functions, a respective set of r segments is retrieved (at 506) from the data structure 102, and this set is used to construct a corresponding version $C'_{i,m(m=1\ to\ l)}$ of the encoded value $C_i$. In other words, l (l·2) versions (possibly corrupt) of the encoded value $C_i$ are created.

The multiple versions $C'_{i,m(m=1\ to\ l)}$ of the encoded value of $V_i$ are decoded (at 508). If it is determined (at 510) that even one of these versions produces a valid output, then the process is complete and the result is output (at 512), where the result is $V_i$. But if none of the versions $C'_{i,m(m=1\ to\ l)}$ can be successfully decoded to provide $V_i$, then a list decoding algorithm is performed (at 514). A list decoding algorithm outputs a list of possible data values for a given input, in this case $C'_{i,m}$. For l inputs ($C'_{i,m(m=1\ to\ l)}$), l lists are created, with each list containing possible data values. If the corrupted versions $C'_{i,m(m=1\ to\ l)}$ are list decodable, then the output $V_i$ would be at the intersection of the l lists. In other words, a common element of the l lists is identified, where the common element is output $V_i$. In an alternative embodiment, instead of applying l families of hash functions to the entire input data value $V_i$, a different form of diversity can be performed, as discussed below. In this alternative diversity embodiment, an input data value $V_i$ is divided into u parts $[v_{i1}, V_{i2}, \ldots, v_{iu}]$, $[[u\cdot 2]]u\geq 2$, where each part has length t/u. Each of the smaller parts $v_{i1}, V_i, \ldots$ can be encoded by an [r, t/s, d'] error correction code, where d'>d because the dimension of the code has decreased.

Effectively each of the u parts $v_{i1}, v_{i2}, \ldots, v_{iu}$ of input data value $V_i$ is encoded to produce r segments for each part $v_{iz}$, z=1 to u. The r segments for each part $v_{iz}$, z=1 to u, is then stored into the data structure 102 using the store algorithm described in connection with FIG. 2.

In storing the r segments for each part $v_{iz}$, a corresponding family of hash functions is used to produce r hash values from the key $K_i$. In other words, u families of hash functions are defined, with each family corresponding to part $v_{iz}$. The same key $K_i$ is hashed using the u hash families. Each such hash yields a q-ary r-tuple (a tuple of r hash values that vary between 1 and q). The q-ary r-tuple is used to store the r segments corresponding to the respective input part $v_{iz}$.

Figure 6:
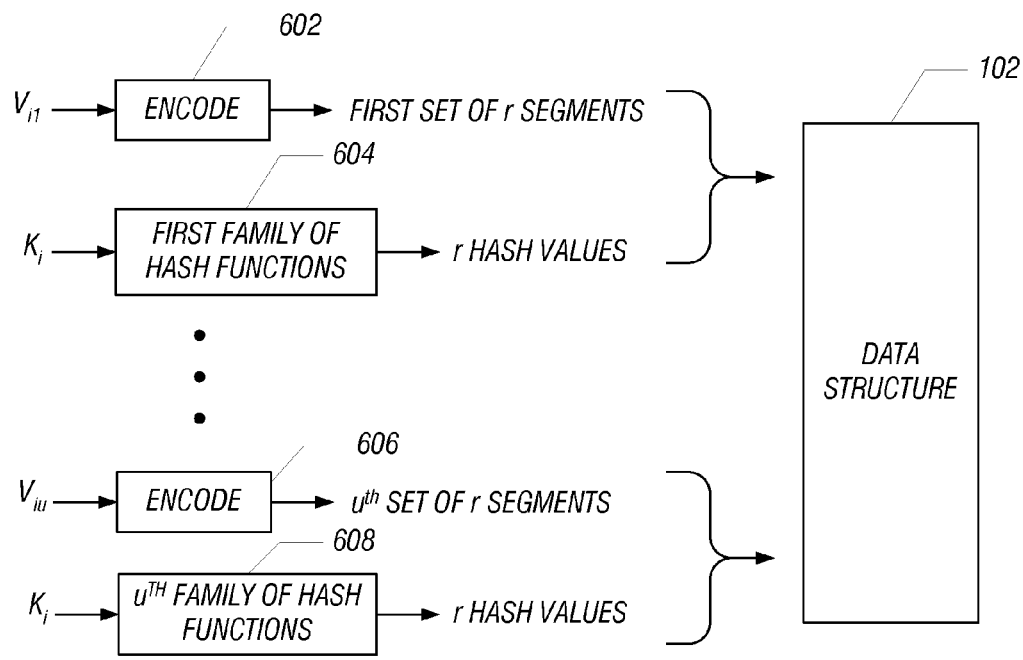
FIG. 6 illustrates encoding of different parts of an input data value for storage into a data structure, according to a further embodiment.

The above process is depicted in FIG. 6. In FIG. 6, $v_{i1}$ is encoded (602) to produce a first set of r segments representing $v_{i1}$. Also, a first family of hash functions is applied (604) on $K_i$ to produce r hash values that are used to point to rows in the data structure 102 that the first set of r segments are to be stored in. This is repeated for each of the other parts $v_{iz}$, with the last part $v_{iu}$ encoded (606) to produce the $u^{th}$ set of r segments. Also, the $u^{th}$ family of hash functions is applied on $K_i$ to produce r hash values that are used to point to rows in the data structure 102 that the $u^{th}$ set of r segments are to be stored in.

Instructions of software described above (including the Store module 106 and Retrieve module 108 of FIG. 1) are loaded for execution on a processor (such as one or more CPUs 110 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer of managing storing of data in a data structure, comprising:
   representing a particular data value as a group of segments stored in corresponding entries of the data structure;
   writing additional data values represented by corresponding groups of segments into the data structure, wherein a probability of overwriting segments representing the particular data value increases as a number of the additional data values increase; and
   retrieving, using error correction, a correct version of the particular data value even though one or more segments representing the particular data value has been overwritten,
   wherein the error correction enables retrieval of the particular data value even if up to a predetermined number of the segments representing the particular data value has been overwritten, and
   wherein the particular data value becomes non-retrievable if more than the predetermined number of the segments representing the particular data value has been overwritten.

2. The method of claim 1, further comprising:
   causing gradual degradation of the particular data value with the writing of the additional data values written into the data structure, wherein the gradual degradation causes the particular data value to become irretrievable after some number of writes of the additional data items.

3. The method of claim 2, wherein gradual degradation of the particular data value enables the data structure, which has a fixed size to accept the additional data values without using a mechanism that has to explicitly select a data value in the data structure to eject.

4. The method of claim 1, further comprising:
   storing the data values in the data structure that is a hash table arranged as rows and columns;
   hashing a key associated with the particular data value plural times to produce plural hash values;
   storing the segments representing the particular data value in respective rows of the hash table according to the corresponding hash values.

5. The method of claim 4, wherein storing the segments comprises storing the segments representing the particular data value in corresponding columns of the hash table.

6. The method of claim 4, further comprising:
   hashing a key associated with each of the additional data values plural times to produce plural hash values for the corresponding key; and
   storing the segments representing each of the additional data values in respective rows of the hash table according to the hash values of the corresponding additional data values.

7. The method of claim 6, wherein at least one of the segments representing at least one of the additional data values map to the same entry in the hash table as a segment corresponding to the particular data value.

8. The method of claim 1, further comprising encoding the particular data value to produce the group of segments.

9. The method of claim 8, wherein encoding the particular data value comprises encoding using an error correction code.

10. The method of claim 1, further comprising:
    in response to receiving a given key to retrieve a corresponding given data value from the data structure, retrieving the segments corresponding to the given data value from the data structure; and
    decoding a code constructed from the retrieved segments to determine whether the given data value is retrievable.

11. The method of claim 10, wherein decoding the code comprises decoding the code using an error correction algorithm.

12. The method of claim 10, wherein constructing the code comprises concatenating the retrieved segments, and wherein the code is possibly corrupt due to possible overwriting of at least one of the retrieved segments due to insertion of another data value into the data structure.

13. The method of claim 1, further comprising:
    inserting plural copies of the particular data value into the data structure to provide diversity for the particular data value, and to increase an expected lifetime of the particular data value in the data structure compared to some other data values in the data structure.

14. The method of claim 13, wherein inserting the plural copies of the particular data value comprises inserting plural corresponding groups of segments into the data structure, where each of the plural groups represents a respective one of the plural copies of the particular data value.

15. The method of claim 1, further comprising:
    dividing a second data value to be stored in the data structure into a plurality of parts;
    encoding each of the plurality of parts to produce a corresponding set of segments; and
    storing the sets of segments that represent the corresponding plurality of parts in the data structure.

16. A method executed by a computer of managing storing of data in a data structure, comprising:
    representing a particular data value as a group of segments stored in corresponding entries of the data structure;
    writing additional data values represented by corresponding groups of segments into the data structure, wherein a probability of overwriting segments representing the particular data value increases as a number of the additional data values increase;
    retrieving a correct version of the particular data value even though one or more segments representing the particular data value has been overwritten;
    inserting plural copies of the particular data value into the data structure to provide diversity for the particular data value, and to increase an expected lifetime of the particular data value in the data structure compared to some other data values in the data structure, wherein inserting the plural copies of the particular data value comprises inserting plural corresponding groups of segments into the data structure, where each of the plural groups represents a respective one of the plural copies of the particular data value;
    defining plural families of hash functions for the particular data value, where each of the plural families includes respective hash functions; and
    for each of the plural groups of the segments, hashing a key associated with the particular data value with a respective one of the plural families of hash functions.

17. The method of claim 16, wherein hashing the key with the respective family of hash functions comprises hashing the key multiple times with corresponding hash functions in the family to produce plural hash values that point to respective entries of the data structure into which corresponding segments of a respective copy of the particular data value are to be stored.

18. A method executed by a computer, comprising:

receiving a first pair of a key and data value to be stored in a hash table;

applying plural functions on the key to produce plural pointer values that point to different entries of the hash table;

encoding the data value to produce segments;

storing the segments representing the data value into entries of the hash table identified by the pointer values, wherein a first of the segments is stored in a first of the entries identified by a first of the pointer values, and a second of the segments is stored in a second of the entries identified by a second of the pointer values; and retrieving, using error correction, a correct version of the data value even though one or more segments representing the data value has been overwritten, wherein the error correction enables retrieval of the data value even if up to a predetermined number of the segments representing the data value has been overwritten, and wherein the data value becomes non-retrievable if more than the predetermined number of the segments representing the data value has been overwritten.

19. The method of claim 18, further comprising:

receiving additional pairs of keys and data values;

storing the additional pairs of keys and data values into the hash table, wherein storing the additional pairs of keys and data values causes gradual degradation of the data value of the first pair.

20. The method of claim 18, wherein applying the plural functions comprises applying plural hash functions on the key.

21. An article comprising at least one computer-readable storage medium containing instructions that when executed cause a computer to:

store plural representations of a first data value in a data structure:

store additional data values in the data structure after storing the plural representations of the first data value, wherein storing the additional data values causes gradual degradation of at least one of the plural representations of the first data value;

in response to a request to retrieve the first data value, retrieve the plural representations of the first data value; and decode the retrieved plural representations to determine whether the first data value is retrievable, wherein the decoding includes using error correction to recover the first data value, where the error correction enables recovery of the first data value even if up to a predetermined number of segments of a particular one of the plural representations has been overwritten, and wherein the first data value becomes non-retrievable from the particular representation if more than the predetermined number of the segments of the particular representation has been overwritten.

22. The article of claim 21, wherein storing the plural representations comprises storing the plural representations that represent plural copies of the first data value.

23. The article of claim 21, wherein storing the plural representations comprises storing the plural representations that represent different parts of the first data value.

* * * * *

UNITED STATES PATENT AND TRADEMARK OFFICE
CERTIFICATE OF CORRECTION

PATENT NO.        : 8,180,744 B2
APPLICATION NO.   : 12/243103
DATED             : May 15, 2012
INVENTOR(S)       : Vinay Deolalikar et al.

It is certified that error appears in the above-identified patent and that said Letters Patent is hereby corrected as shown below:

In the Specification:

In column 2, line 12, below "data." insert -- In the ensuing discussion, reference is made to storing key-data value pairs in the data structure. Note, however, that techniques according to some embodiments can be applicable to storing other types of data in a fixed-size data structure. A key-data value pair refers to a pair that includes a key and an associated data value, where the key is a pointer to where the data value is to be stored in a data structure. --.

Signed and Sealed this
Eighteenth Day of June, 2013

Teresa Stanek Rea
*Acting Director of the United States Patent and Trademark Office*